United States Patent
Van Kreuningen

[15] 3,669,388
[45] June 13, 1972

[54] ELECTRONICALLY CONTROLLED AND PYROTECHNIC CREW ESCAPE SYSTEM AND METHOD

[72] Inventor: Rudolf Van Kreuningen, Torrance, Calif.

[73] Assignee: Explosive Technology, Fairfield, Calif.

[22] Filed: Oct. 29, 1969

[21] Appl. No.: 872,023

[52] U.S. Cl. ...................................................244/138 R
[51] Int. Cl. .............................................................B64d 25/00
[58] Field of Search................244/138–152, 122 R–122 AH, 244/122, 138 R, 122 AE; 102/28; 136/83, 6

[56] References Cited

UNITED STATES PATENTS

| | | |
|---|---|---|
| 2,501,559 | 3/1950 | Winzen et al. ...........................244/138 |
| 2,570,295 | 10/1951 | Vantine, Jr. ...........................244/150 |
| 3,067,973 | 12/1962 | Halsey et al. ...........................244/140 |
| 3,270,217 | 8/1966 | Willard...........................244/151 X R |
| 3,273,835 | 9/1966 | Holt et al. ...........................244/138 |
| 3,388,879 | 6/1968 | Pisano et al...........................244/152 |
| 3,470,029 | 9/1969 | Meyers et al...................136/144 X |
| 3,567,158 | 3/1971 | Coyle ...............................244/122 B |

Primary Examiner—Milton Buchler
Assistant Examiner—Paul E. Sauberer
Attorney—Flehr, Hohbach, Test, Albritton and Herbert

[57] ABSTRACT

Pyrotechnic crew escape system having electronic switches and time delays for sequencing the firing of pyrotechnic devices in the ejection and recovery of a crew member from an aircraft.

8 Claims, 5 Drawing Figures

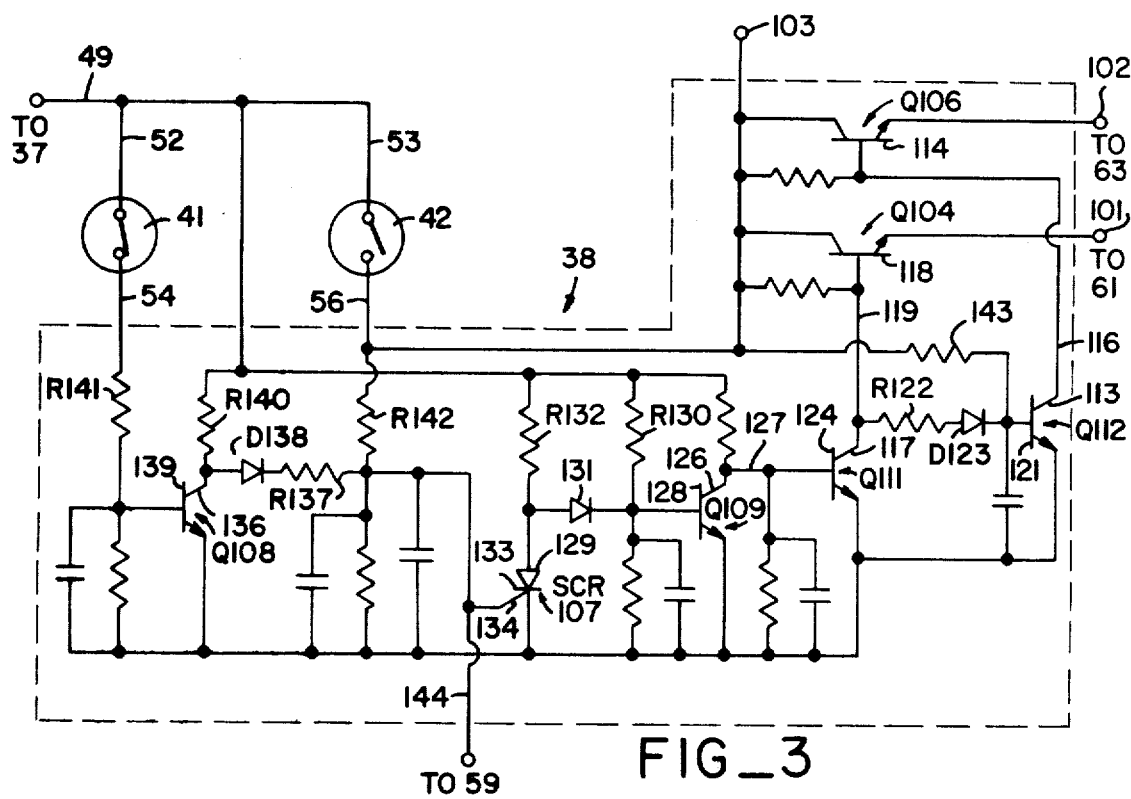
FIG_3
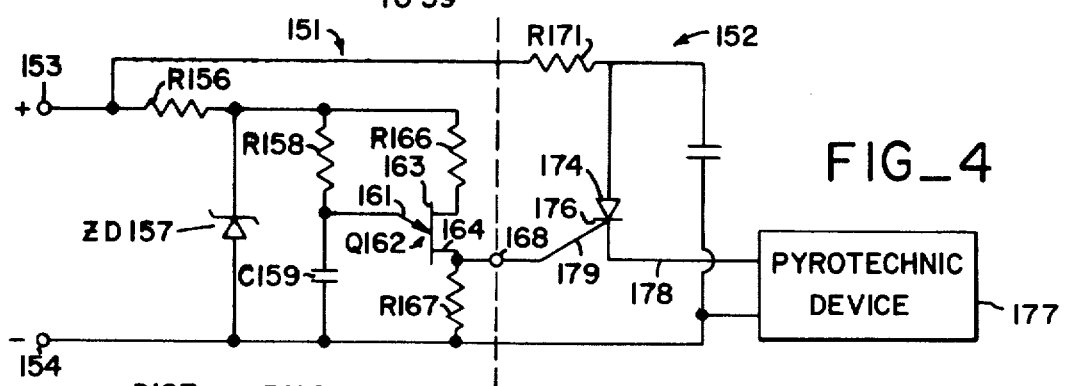
FIG_4
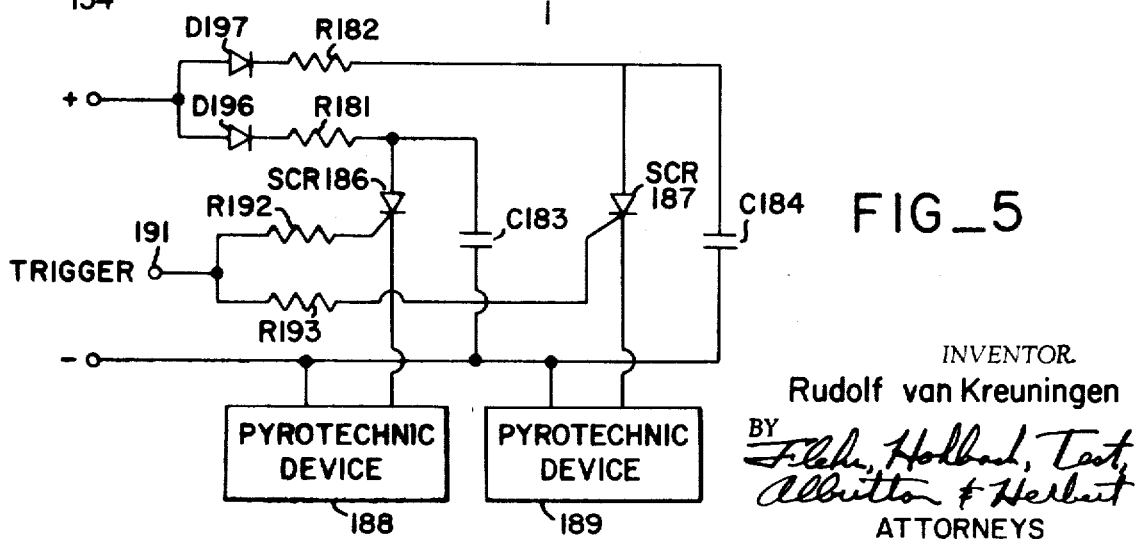
FIG_5
*INVENTOR.*
Rudolf van Kreuningen
BY
ATTORNEYS 3,669,388

ELECTRONICALLY CONTROLLED AND PYROTECHNIC CREW ESCAPE SYSTEM AND METHOD

BACKGROUND OF THE INVENTION

This invention pertains generally to escape systems for vehicles such as aircraft and more particularly to an electronic sequencing system and method for a crew escape system of the type utilizing pyrotechnic devices.

Crew escape systems have heretofore been provided in airplanes used for military purposes. A simple form of such a system consists of a parachute pack harnessed to the pilot or another crew member. While this system is adequate for escape out of slow flying aircraft at medium altitudes, it is unsatisfactory at low altitudes, extremely high altitudes and/or high speeds. At low altitudes the parachute does not have time to deploy its canopy, and at extremely high altitudes lack of oxygen is a problem. At the high speeds attained by present day aircraft, there is insufficient time for the crew member to jump clear of the aircraft without danger of being struck by the oncoming tail section.

Various systems have been devised for overcoming the foregoing problems, and the present day military aircraft are commonly equipped with a seat ejector system. In this system, the pilot or crew member is strapped into his seat, and the man and seat are catapulted out of the aircraft.

Pyrotechnic devices are commonly used for ejecting the crewman and seat from the aircraft, for retarding the descent of the crewman and seat, and for deploying a parachute at the proper altitude. In such systems, it is important that the pyrotechnic devices be ignited in the proper sequence and with the proper time intervals between firings. This timing may be dependent on environmental conditions such as altitude and velocity.

Heretofore, a common means for providing the time intervals in pyrotechnic crew escape systems has consisted of the use of pyrotechnic delay devices such as timing fuses. Such devices cannot provide accurate timing, and their reliability is undesirably low. Moreover, they cannot be tested since testing necessarily involves destruction of the devices.

A pyrotechnic programming system utilizing conventional electromechanical time delay devices, known as unlatching switches, to provide time intervals is described in U.S. Pat. No. 3,420,174, issued Jan. 7, 1969. Such unlatching switches have mechanical contacts which are adapted for opening after a predetermined time by the current flowing through them. They are subject to contact bounce and chatter, and severe shock or vibration can cause them to switch inadvertently. Furthermore, such devices have relatively slow switching times.

There is, therefore, a need for a new and improved crew escape system which includes means for overcoming the foregoing and other problems encountered with systems heretofore provided.

SUMMARY AND OBJECTS OF THE INVENTION

The present invention provides an electronically controlled pyrotechnic sequencing system wherein electronic switches and electronic time delays provide reliable firing of the pyrotechnic devices at accurately determined intervals.

It is in general an object of the invention to provide a new and improved system and method for sequentially firing pyrotechnic devices in a crew escape system.

Another object of the invention is to provide a system and method of the above character which utilizes electronic switching means.

Another object of the invention is to provide a method and system of the above character which utilizes electronic time delay means.

Additional objects and features of the invention will be apparent from the following description in which the preferred embodiment is set forth in detail in conjunction with the accompanying drawing.

BRIEF DESCRIPTION OF THE DRAWING

FIG. 1 is a block diagram of one embodiment of an electronic pyrotechnic sequencing system incorporating the present invention.

FIG. 2 is a circuit diagram of one embodiment of an electronic switch which can be used in the system shown in FIG. 1.

FIG. 3 is a circuit diagram of another embodiment of an electronic switch which can be used in the system shown in FIG. 1.

FIG. 4 is a circuit diagram of one embodiment of a combined electronic time delay and firing circuit which can be used in the system shown in FIG. 1.

FIG. 5 is a circuit diagram of one embodiment of a firing circuit adapted for igniting a plurality of pyrotechnic devices.

DESCRIPTION OF THE PREFERRED EMBODIMENT

The sequencing system shown in FIG. 1 comprises generally ejection sequencing means 11 adapted to be carried by an aircraft or like vehicle, recovering sequencing means 12 adapted to be ejected from the vehicle with a crew member, and electrical connector means 13 removably connecting the ejection sequencing means to the recovery sequencing means.

The ejection sequencing means includes a source of electrical power 16, a reel igniter 17, a canopy igniter 18, a rocket catapult igniter 19, and electronic delay means 20.

In the preferred embodiment, the power source 16 comprises a thermal battery which is normally in an inactive state. In this inactive state, the battery's electrolyte is a crystalline material which must be melted to activate the battery. Melting of the crystalline electrolyte is accomplished by ignition of a pyrotechnic compound within the battery. The heat generated by this reaction liquifies the electrolyte, thereby energizing the power source 16.

Both electrical and mechanical means are provided for causing the power source 16 to assume its active state. The electrical means is designated by the reference numeral 22 and includes a bridge wire adapted to be energized by energy from the electrical system of the vehicle. Energization of the bridge wire detonates a percussion cap within the battery. The mechanical means, designated by the reference numeral 23, includes a mechanical striker adapted for detonating the percussion cap. Detonation of the percussion cap ignites a heat-producing pyrotechnic device that produces liquification of the electrolyte. Activation of the first battery provides energy by which the batteries of subsequently energized systems may be activated electrically. Alternately, subsequently energized systems may be activated by like mechanical means.

The reel igniter 17 comprises an electrically ignited pyrotechnic device that actuates a power reel to strap the pilot or other crew member into his seat. The canopy igniter 18 comprises an electrically fired pyrotechnic device that jettisons the canopy of the aircraft. The reel igniter 17 is connected directly to the power source 16 by circuits 26, 27 and 28, and the canopy igniter 18 is connected directly to the source by circuits 26, 27 and 29. Thus, these igniters are adapted for strapping the pilot or crewman into his seat and jettisoning the canopy at substantially the same time the power source 16 is activated.

The rocket catapult igniter 19 includes a firing circuit adapted to ignite a conventional pyrotechnic device for ejecting the pilot or crew member and his seat from the aircraft. The igniter 19 receives power from the source 16 through the circuit 26, electronic delay means 20, and circuit 31. In the preferred embodiment, the firing circuit of the catapult igniter is a capacity discharge circuit of the type illustrated in FIG. 4 and described hereinafter.

The electronic delay means 20 is of the type which is also illustrated in FIG. 4, and in the preferred embodiment, this delay means provides a delay on the order of 0.3 second. This delay permits the pilot or crewman to be strapped into his seat and the canopy to be jettisoned before ejection occurs.

The connector means 13 of FIG. 1 provides releasable means for conducting electrical energy from the ejection sequencing means to the recovery sequencing means prior to ejection. It includes a conventional electrical connector comprising a plug 32 and a socket 33. The plug is electrically connected to the circuit 27 in the ejector sequencing means. The socket 33 is associated with the recovery sequencing means and is adapted to be ejected with that means. Preferably, this connector should be of a type which provides reliable electrical contact between the plug and socket when they are engaged, yet permits them to be readily separated by merely pulling them apart.

The recovery sequencing means 12 includes a source of electrical power 36, electronic switches 37 and 38, environmental sensors 41 and 42, and a plurality of electronic delay means and firing circuits.

In the preferred embodiment, the power source 36 includes a liquid ammonia battery having an inactive state and an active state. Liquid ammonia is used as the electrolyte in this battery and is retained out of contact with the plates during the inactive state. The battery includes a bridge wire and a small pyrotechnic device for releasing the ammonia to the plates in response to an electrical signal. The bridge wire is connected to the socket 33 by a circuit 43.

If desired, redundancy can be provided by using a plurality of liquid ammonia batteries in the power source 36. These batteries can be connected in parallel and isolated from each other by conventional means such as diodes.

An arm restraint thruster 44 of conventional design is provided for restraining the arms and legs of the pilot or crewman during ejection from the plane. Such devices typically include straps adapted for engaging the arms and legs and securing them to the ejection seat. In the preferred embodiment, this device is pyrotechnically activated and is connected to the socket 33 by circuits 43, 46.

The output of the power source 36 is connected to the electronic switch 37 by a circuit 47. The switch 37 is a latching single pole, single throw switch of the type shown in FIG. 2 and described hereinafter in detail. Actuation of this switch causes power to be delivered to the circuits 48 and 49.

The circuit 48 is connected to a firing circuit 51 which is adapted for deploying a pyrotechnically activated stabilization system, such as one produced by Douglas Aircraft, and commonly known as Stapac. The Stapac functions to stabilize and maintain the pilot or crewman and his seat in a proper orientation following ejection from the aircraft by the action of a pyrotechnically actuated, gas powered gyroscopic turbine working in conjunction with a small rocket thruster located beneath the seat. The firing circuit 51 can include a capacitive discharge circuit of the type illustrated in FIG. 4.

The circuit 49 is connected to the circuits 52 and 53 for delivering power to the environmental sensors 41 and 42, respectively. The sensor 41 includes a conventional velocity sensitive switch having a pair of contacts adapted to be closed below a predetermined velocity and to be open above that velocity. The output of the velocity sensor 41 is connected to one control input of the electronic switch 38 by a circuit 54.

The sensor 42 includes an altitude sensitive switch having a pair of contacts adapted to be open below a predetermined altitude and to be closed above that altitude. The output of the altitude sensor 42 is connected to a second control input of the electronic switch 38 by a circuit 56.

The electronic switch 38 is a multiple pole electronic switch of the type illustrated in FIG. 3 and described hereinafter in detail. In the preferred embodiment, this switch is characterized in that its switching action is independent of the presence or absence of power on its poles. Thus, once switched to a given position, the switch 38 will remain in that position even though the power is removed from the poles of the switch.

Means is provided for retarding the descent of the ejected pilot or crewman. This means includes a conventional drogue gun adapted to be fired by means of a drogue gun firing circuit 58. This circuit can include a capacitive discharge firing circuit of the type hereinafter described and is connected for receiving a trigger signal from the electronic switch 38 through a circuit 59.

One pole of the electronic switch 38 is connected through a circuit 61 to a circuit 62. The other pole of the switch is connected by a circuit 63 to an electronic delay circuit 64. This delay circuit can be of the type shown in FIG. 4. In the preferred embodiment, it provides a time delay on the order of 0.51 second. The output of the delay means 64 is applied to the circuit 62 through a circuit 66.

The circuit 62 is connected to a plurality of delay circuits 67, 68, 69, 70. These circuits can be electronic delay circuits of the type shown in FIG. 4, and in the preferred embodiment they provide time delays on the order of 0.04 second, 0.24 second, 0.27 second, and 1.84 seconds, respectively.

The outputs of the delay circuits 67, 68, 69, and 70 are connected through circuits 72, 73, 74, and 75, respectively, to firing circuits 77, 78, 79, and 80. These firing circuits can all be of the capacitive discharge type illustrated in FIG. 4. Each is adapted for firing a pyrotechnic device to initiate a particular phase in the recovery of the pilot or crewman. Thus, the firing circuit 77 causes the main parachute to be deployed, circuits 78 and 79 cause release of the upper and lower bridles for the drogue gun, and the circuit 80 releases the pilot or crewman from the seat. Because of the different time delays of the circuits 67 to 70, the phases of the recovery operation are initiated in a predetermined sequence, separated by predetermined time intervals.

FIG. 2 shows a preferred embodiment of the single pole, single throw electronic switch 37. This switch includes an input terminal 82 adapted to be connected to the circuits 48 and 49. Conduction between the terminals 82 and 84 is controlled by a conventional switching transistor Q84. The transistor Q84 is controlled by another conventional switching transistor Q86 which in turn is controlled by a silicon controlled rectifier SCR87. This SCR is triggered by means of a normally open switch S88. This switch is attached to the ejection seat of the pilot or crewman and is adapted to be closed by the ejection of the seat from the aircraft.

Under normal conditions, that is prior to ejection, power is applied between the input terminal 82 ad ground, and there is no output at the terminal 84. During this time, there is no trigger signal applied to the gate 89 of the SCR, and the SCR remains nonconductive. Base current is supplied to the transistor Q86 through a resistor R91 and diode D92, saturating the transistor Q86. The base 93 of the transistor Q84 is grounded through the transistor Q86, holding the transistor Q84 in its nonconductive state.

Closing of the switch S88 causes a trigger signal to be applied to the gate 89 of the SCR, turning on the SCR. This grounds the base 94 of the transistor Q86, turning that transistor off. The transistor Q84 is now turned on by base current flowing through resistor R96, and the voltage at the output terminal 84 will be nearly equal to the voltage at the input terminal 82. Because of the latching action of the SCR, the transistor Q86 will remain off and the transistor Q84 will remain on as long as power is present at the input terminal 82.

As illustrated in FIG. 3, the electronic switch means 38 includes a pair of output poles 101 and 102 adapted to be connected to the circuits 61 and 63, respectively. This switch means also includes an input pole 103 adapted to be connected for receiving power from the source 36. A first switching transistor Q104 is connected intermediate the input pole 103 and output pole 101 for controlling the flow of current between these poles. Likewise, a second switching transistor Q106 is provided for controlling the flow of current between the poles 103 and 102.

The switching means 38 also includes electronic signal conditioning means for providing control signals to determine the states of conductivity of the transistors Q104 and Q106. The signal conditioning means includes a silicon controlled rectifier SCR107 and transistors Q108, Q109, Q111, and Q112. The collector 113 of the transistor Q112 is connected to the base 114 by means of a conductor 116, making the state of conductivity of the transistor Q106 dependent upon the state of the transistor Q112.

The collector 117 of the transistor 111 is connected to the base 118 of the transistor Q104 by a conductor 119 and to the base 121 of the transistor Q112 by a resistor R122 and diode D123. Thus, the states of the transistors Q104 and Q112 are adapted to be determined by the state of the transistor Q111.

The base 124 of the transistor Q111 is connected to the collector 126 of the transistor Q109 by a conductor 127, adapting the transistor Q111 for control by the transistor Q109.

The base 128 of the transistor Q109 is connected to the anode 129 of the silicon controlled rectifier SCR107 through a diode 131. The junction of the diode 131 and SCR anode 129 is connected to a source of positive voltage through a resistor 132. The cathode 133 of the SCR is connected to ground. Thus, the state of the transistor Q109 is controlled by the SCR.

The gate 134 of the SCR is connected to the collector 136 through a resistor 137 and a diode 138, adapting the SCR for control by the transistor Q108, or through R142 by the altitude sensor 42.

The velocity sensor 41 and altitude sensor 42 are connected to the signal conditioning means in such manner that the states of the switching transistors Q104 and Q106 are primarily controlled by these sensors.

The input of the velocity sensing switch 41 is connected for receiving power from the electronic switch 37 through the circuits 49 and 52. The output of the velocity sensor 41 is connected to the base 139 of the transistor 108 through the circuit 54 and a resistor 141. Thus, the state of the transistor Q108 is determined by the velocity sensor.

The input of the altitude sensing switch 42 is connected for receiving power from the switching means 37 through the circuits 49 and 53. The output of the altitude sensor is connected to the gate 134 of the silicon controlled rectifier SCR107 through a resistor 142 and to the base 121 of the transistor 112 through a resistor 143. Thus, the altitude sensor is adapted for controlling the states of both the SCR and the transistor Q112.

The electronic switch 38 also includes means for triggering the drogue gun firing circuit 58. Thus, the circuit 59 is connected to the junction of the resistor 137, the resistor 142, and the SCR gate 134 by means of a conductor 144.

Operation of the electronic switch 38 can now be described briefly as follows. Initially, let it be assumed that the ejected pilot or crewman is at a low altitude, in which case the contacts of the altitude sensing switch 42 remain open. At low velocities, the contacts of the velocity sensing switch 41 will be closed, and base drive will be applied to the transistor Q108 through the resistor 141, turning this transistor on. The SCR gate 134 is grounded through the resistor R137, diode D138, and transistor Q108, thereby maintaining the SCR in its non-conductive state. With the SCR turned off, the transistor Q109 receives base drive through the resistor R130 and is turned on. The base 124 of the transistor Q111 is grounded through the transistor Q109; hence, this transistor is off. Since the transistor Q111 is off, the transistor Q104 is on, and an output signal appears at the terminal 101 and in the circuit 61. Also, with the transistor Q111 off, the transistor Q112 is on, and the transistor Q106 is off, so there is no output at the terminal 102 or in the circuit 63.

At high velocities, the velocity sensing switch 41 opens, and the transistor Q108 is turned off. A positive voltage is applied to the SCR gate 134 through the resistor R140, diode D138, and resistor R137, triggering the drouge firing circuit 58 and also triggering the SCR into conduction. The base 128 of the transistor 109 is grounded, turning this transistor off and turning the transistor Q111 on. With the transistor Q111 on, the transistor Q112 is turned off, and the transistor Q106 is turned on, with a signal appearing at the output terminal 102 and in the circuit 63. With the transistor Q111 turned on, the transistor Q104 is turned off, and there is no output at the pole 101 or in the circuit 61.

At high altitudes, the contacts of the altitude sensing switch 42 are closed, and power is applied to the drouge gun firing circuit through the resistor R142 and conductor 144. Current also flows through the switch 42, and resistor R143 to the base 121 of the transistor Q112, turning this transistor on. With the transistor Q112 turned on in this manner, the transistors Q104 and Q106 are both turned off, and there is no signal at either of the poles 101, 102 or in the circuits 61, 63.

It is to be noted that once the silicon controlled rectifier SCR107 has been triggered, it remains turned on as long as power is applied to it through the resistor 132. This tends to latch the switch 38 in the condition whereby Q104 is turned off and Q106 is turned on, with an output appearing at the terminal 102 and in the circuit 63. Further, it is to be noted that the circuit permits the transistors Q104 and Q106 to be switched and maintained in a given state independently of the presence of power at the pole 103.

FIG. 4 illustrates preferred embodiments of an electronic time delay circuit 151 and a capacitive discharge firing circuit 152 which can be utilized in the present invention.

The delay circuit 151 includes a pair of input terminals 153 and 154 adapted to be connected to a source of dc voltage. A resistor R156 and Zener diode Zd157 are connected in series between the terminals 153 and 154 to provide a source of constant voltage across the Zener diode. A resistor R158 and a capacitor C159 are connected in series across the Zener diode. The junction of the resistor R158 and capacitor C159 is connected to the emitter 161 of a unijunction transistor Q162. The bases 163 and 164 of the unijunction transistor are connected to the source of voltage by resistors R166 and R167, respectively. The junction of the base 164 and resistor R167 is connected to an output terminal 168.

Operation of the electronic delay circuit can now be described briefly as follows. With zero voltage applied to the input terminals 153, 154 there will be no output at the terminal 168. When the terminal 153 is made positive with respect to the terminal 154, the capacitor C159 begins to charge through the resistor R158. When the voltage across the capacitor C159 reaches the threshold voltage of the transistor Q162, this transistor fires and a positive voltage appears at the output terminal 168. The rate at which the capacitor C159 charges is determined primarily by the values of the capacitor and the resistor R158.

The capacitive discharge firing circuit 152 includes a resistor R171, a capacitor C172, and a silicon controlled rectifier SCR173. The resistor R171 and capacitor C172 are connected in series to a source of dc voltage such as that applied to the input terminals 153 and 154 of the delay circuit 151. The junction of the resistor and capacitor is connected to the anode 174 of the silicon controlled rectifier, and the cathode 176 of the SCR is connected to one input terminal of a pyrotechnic device 177 by a circuit 178. The other input terminal of the pyrotechnic device is connected to the side of the capacitor opposite the resistor R171. The SCR gate 179 is connected to a trigger signal source, such as the output terminal 168 of the time delay circuit 151.

Operation of the firing circuit 152 can be described briefly as follows. Application of a voltage across the resistor R171 and capacitor C172 causes the capacitor to charge. When a trigger signal is applied to the SCR gate 179, the SCR fires, discharging the capacitor C172 into the pyrotechnic device 177, firing that device.

The electronic capacitive discharge firing circuit has been found to provide a reliable means of igniting pyrotechnic devices from a battery capable of providing only a small fraction of the necessary firing current. In the circuit shown in FIG. 4, the resistor R171 provides means for limiting the flow of current through the SCR after the pyrotechnic device has fired. Thus, if the firing of the device should produce a short circuit, the resistor R171 prevents excessive drain on the battery.

FIG. 5 shows a capacitive discharge circuit for firing two pyrotechnic devices from a single trigger signal. This circuit is generally similar to the firing circuit shown in FIG. 4 except that it includes two resistors R181 and R182, two capacitors C183 and C184, and two silicon controlled rectifiers SCR186 and SCR187. The capacitor C183 charges through the resistor R181 and is discharged through the silicon controlled rectifier SCR186 into the pyrotechnic device 188. The capacitor C184 is charged through the resistor R182 and discharged through the silicon controlled rectifier SCR187 into the pyrotechnic device 189. The gates of the SCRs are connected to a common trigger terminal 191 by resistors R192 and R193. These resistors provide partial isolation of the gates of the SCRs. Diodes D196, D197 are connected between the resistors R181, R182 and the source of voltage to provide further isolation between the SCRs and assure that a short in either pyrotechnic device will not prevent the other from firing.

Operation of the overall system of the present invention can now be described briefly. Initially, let it be assumed that a pilot wishes to eject himself from an aircraft flying at low velocity and low altitude. Activation of the thermal battery 16 causes power to be applied immediately to the reel igniter 17 and canopy igniter 18, strapping the pilot into his seat and jettisoning the canopy. At the same time, power is applied to the arm restraint thruster 44, and the pilot's arms and legs are strapped down. Power is also applied to the electronic delay circuit 20, and after a 0.3 second delay the catapult rocket is ignited, ejecting the pilot and his seat from the aircraft.

Activation of the termal battery 16 also causes power to be applied to the bridge wire of the liquid ammonia battery 36, activating that battery. Ejection of the pilot and his seat causes the switch S88 to be actuated, turning on the electronic switch 37 and supplying power to the Stapac firing circuit 51 and to the velocity sensor 41 and altitude sensor 42. The circuit 51 fires immediately, deploying the stabilization system.

With the aircraft at low velocity and low altitude, the velocity switch 41 is closed, and the altitude switch 42 is opened. This conditions the electronic switch 38 such that an output signal is applied to the circuit 61, but not to the circuit 63. There is no output to the circuit 59 in this condition, and the drogue gun is not fired. The signal in the circuit 61 is transferred directly to the circuit 62 to actuate the delay circuits 67, 68, 69 and 70. The main parachute is deployed 0.04 second after the circuit 62 is energized, the lower and upper drogue gun bridles are released after delays of 0.24 second and 0.27 second, respectively, and the seat is released after a delay of 1.84 seconds.

If the pilot were ejected at low altitude and high velocity, both of the environmental switches would be open. This would condition the electronic switch such that the drogue gun would be fired and there would be an output in the circuit 63. The signal in this circuit activates the timing circuit 64 and after a delay of 0.51 second produces a signal in the circuit 62. Thereafter, the parachute, drogue gun bridle, and seat harness firing circuits are fired in the same sequence as above.

At high altitudes, the altitude sensing switch 42 remains closed, and the electronic switch 38 is conditioned such that the drogue gun is fired, but there is no output to either circuit 61 or circuit 63. When the pilot reaches a low altitude, the switch 42 opens and the sequencing of the parachute, drogue gun bridle, and seat harness firing circuits is controlled by the velocity sensor 41 in the manner described above.

It is apparent from the foregoing that a new and improved system and method for sequentially firing pyrotechnic devices in a crew escape system has been provided. This system and method utilize electronic switches to provide fast and reliable firing of the pyrotechnic devices and electronic time delays to provide accurate time intervals.

I claim:

1. In a crew escape system of the type including an electrical power source and a plurality of pyrotechnic devices adapted to be ejected with a crew member from a vehicle, electronic switch means connected intermediate the power source and pyrotechnic devices for selectively controlling the flow of power from said source to said devices for firing said devices, said electronic switch means including a plurality of solid state switching devices each having terminals connected intermediate said power source and one of said pyrotechnic devices, each of said switching devices also having a conductive state in which power can flow between its terminals and a nonconductive state in which such power cannot flow, and electronic signal conditioning means connected to said switching devices for supplying control signals to said devices for selectively switching them between their conductive and nonconductive states and maintaining them in such states independently of the presence of absence of power at said terminals.

2. A system as in claim 1 together with environmental sensing means responsive to predetermined environmental conditions such as altitude and velocity, and means connecting said sensing means to said signal conditioning means in such manner that the control signals supplied to said switching devices are determined by said environmental conditions.

3. In a crew escape system of the type including an electrical power source and at least one pyrotechnic device adapted to be ejected with a crew member from a vehicle, electronic switch means connected intermediate the power source and pyrotechnic device, and capacitive discharge means connected for firing said pyrotechnic device, said capacitive discharge means including a capacitor connected to said power source for receiving current therefrom, solid state switch means adapted for connecting said capacitor to said pyrotechnic device in response to a trigger signal from said electronic switch means, and current limiting means intermediate said capacitor and said power source to prevent excessive power drain from said source following the firing of said pyrotechnic device.

4. A system as in claim 3 together with an additional pyrotechnic device and additional capacitive discharge means of the character described in claim 3 for firing said additional device from the same trigger signal that fires the first named device, and diode means connected intermediate said power source and the capacitor in each discharge means to provide isolation between the first named and additional pyrotechnic devices.

5. In a crew escape system for ejecting a crew member from a vehicle, a first battery and at least one pyrotechnic device adapted to be ejected with the crew member, said battery having active and inactive states and being adapted for assuming the active state in response to an electrical signal, electronic switch means adapted to be ejected with the crew member, said electronic switch means being connected intermediate the battery and pyrotechnic device for controlling the flow of power from said battery to said device, ejection sequencer means carried by the vehicle for applying an electrical signal to said battery, and means releasably connecting said battery electrically to said ejection sequencer means, said ejection sequencer means including a second battery having inactive and active states and being adapted for mechanical and electrical activation, electrically ignited rocket catapult means for ejecting the crew member from the vehicle, and electronic time delay means connected intermediate said second battery and said catapult means for delaying the ejection of said crew member for a predetermined interval of time after activation of said second battery.

6. In an electronically controlled pyrotechnic system for enabling a crew member to escape from a vehicle, electronic ejection sequencing means carried by said vehicle, electronic recovery sequencing means adapted to be ejected from the vehicle with the crew member, and electrical means releasably connecting said ejection sequencing means to said recovery sequencing means, said ejection sequencing means including battery means having active and inactive states and being adapted for mechanical and electrical activation, means connecting the output of said battery means to said electrical means, electrically ignited pyrotechnic means for ejecting the crew member from the vehicle, and electronic delay means connected intermediate said battery means and said pyrotechnic means for delaying the ignition of said pyrotechnic means for a predetermined time interval after activation of said battery means.

7. In an electronically controlled pyrotechnic system for enabling a crew member to escape from a vehicle electronic ejection sequencing means carried by said vehicle, electronic recovery sequencing means adapted to be ejected from the vehicle with the crew member, and electrical means releasably connecting said ejection sequencing means to said recovery sequencing means, said recovery sequencing means including a battery having active and inactive states, said battery being connected to said electrical means for receiving a signal from said ejection sequencing means for causing said battery to assume its active state, latching electronic switch means electrically connected to said battery and adapted to be triggered as the recovery sequencing means is ejected from the vehicle, a plurality of pyrotechnic devices, multiple pole electronic switch means connected intermediate said battery and said pyrotechnic devices for selectively controlling the flow of power to said devices, electronic time delay means connected intermediate said multiple pole electronic switch means and said pyrotechnic devices for sequencing the firing of said devices, and electronically controlled firing means intermediate said delay means and pyrotechnic means adapted for receiving and storing energy from said battery and delivering said energy to the pyrotechnic devices in response to signals from said delay means.

8. In a crew escape system, a liquid amonia battery, at least one pyrotechnic device adapted to be ejected with a crew member from a vehicle, said battery having active and inactive states and being adapted for assuming the active state in response to an electrical signal, electronic switch means connected intermediate the battery and pyrotechnic device for controlling the flow of energy from said battery to said device, ejection sequencer means carried by the vehicle for applying an electrical signal to said battery to activate the same, and means releasably connecting said battery electrically to said ejection sequencer means before said battery is activated.

* * * * *